United States Patent
Cowan

(10) Patent No.: US 7,430,784 B1
(45) Date of Patent: Oct. 7, 2008

(54) VACUUM-CLEANING APPARATUS FOR A STABLE

(76) Inventor: Timothy L. Cowan, Route 2, Box 110B, Prague, OK (US) 74864

(*) Notice: Subject to any disclaimer, the term of this patent is extended or adjusted under 35 U.S.C. 154(b) by 550 days.

(21) Appl. No.: 11/282,018

(22) Filed: Nov. 18, 2005

(51) Int. Cl.
*E01H 1/08* (2006.01)
*A47L 5/12* (2006.01)

(52) U.S. Cl. ........................... 15/348; 15/340.3
(58) Field of Classification Search ............... 15/348, 15/383, 372, 350, 340.3
See application file for complete search history.

(56) References Cited

U.S. PATENT DOCUMENTS

| | | |
|---|---|---|
| 1,878,901 A | 9/1932 | Smellie |
| 3,618,157 A | 11/1971 | Bassin |
| D289,861 S | 5/1987 | Wachob et al. |
| 4,901,393 A | 2/1990 | Tucker |
| 5,001,893 A * | 3/1991 | Stanley et al. .............. 56/328.1 |
| 5,010,620 A * | 4/1991 | Young ......................... 15/347 |
| 5,638,574 A | 6/1997 | Haupt et al. |
| 5,784,756 A * | 7/1998 | Slocum et al. ............... 15/348 |
| 6,120,615 A | 9/2000 | Fletcher |

\* cited by examiner

*Primary Examiner*—David B Thomas
(74) *Attorney, Agent, or Firm*—Donald R. Schoonover

(57) ABSTRACT

A vacuum-cleaning apparatus for a stable, the apparatus adapted for being towed behind a powered vehicle having a power take off unit and including a two-wheel trailer; a tank with an air-tight cavity mounted on the trailer; a hydraulic pump powered by the power take off unit of the powered vehicle; a vacuuming unit powered by a hydraulic motor and having a vacuum input and a conduit connecting the vacuum input to the tank cavity, a debris-removing unit having an intake unit with a scoop element and a hand-operated handle with rotating tines powered by the hydraulic motor and having a first vacuum hose connecting the intake unit to the tank cavity; and a debris-scattering unit powered by the hydraulic motor, including a conveyor for scattering debris rearwardly and an auxiliary scattering portion for scattering debris transversely behind the trailer. The apparatus may also include a hand-held rake with hollow tines connected to the tank cavity.

3 Claims, 1 Drawing Sheet

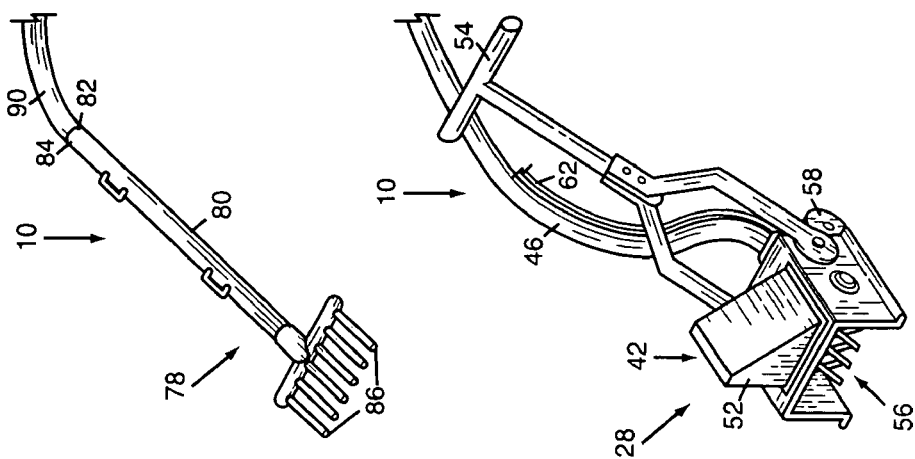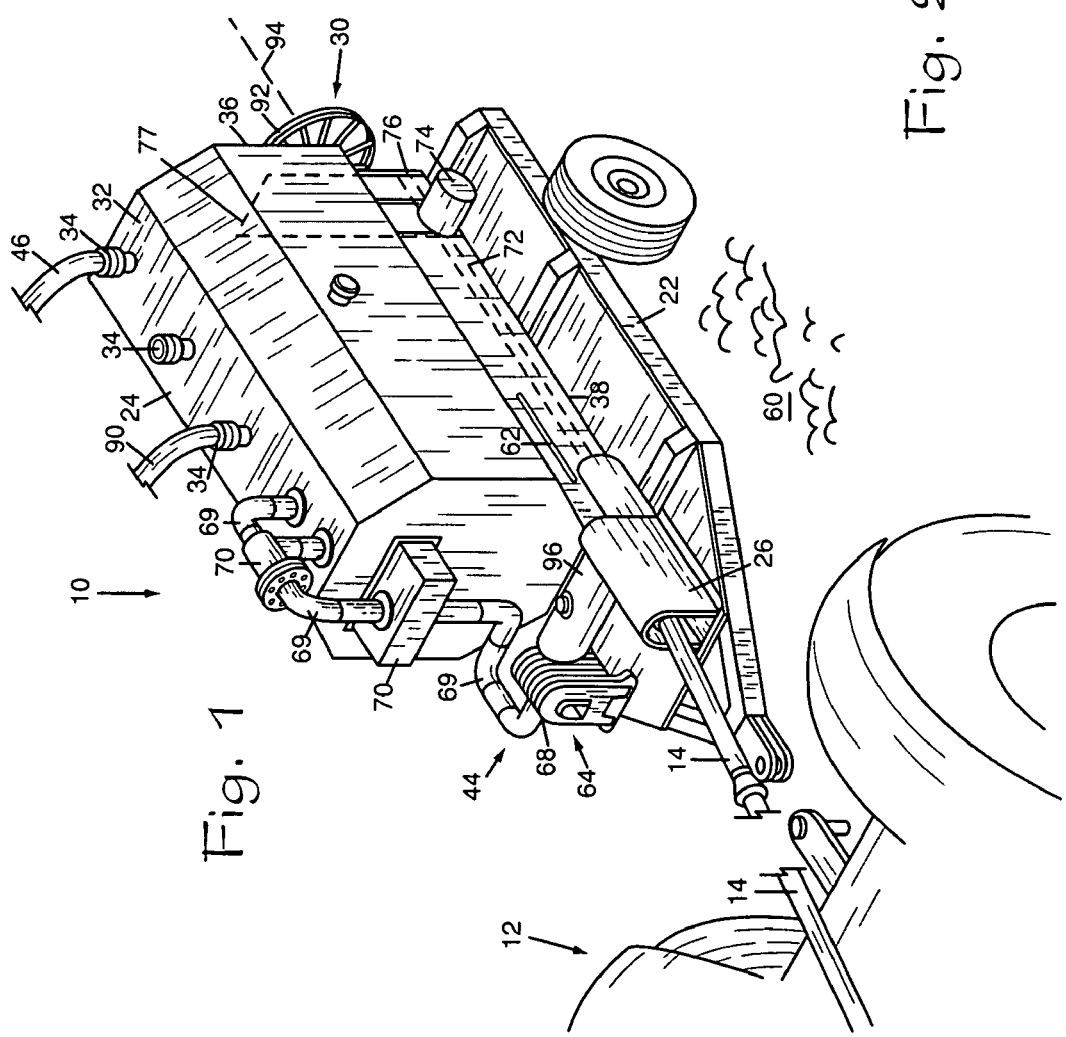

US 7,430,784 B1

VACUUM-CLEANING APPARATUS FOR A STABLE

BACKGROUND OF THE INVENTION

1. Field of the Invention

The present invention relates to cleaning equipment and, more specifically without limitation, to vacuum cleaning equipment.

2. Description of the Related Art

Ranches require regular maintenance, which involves a considerable amount of time and labor. Fences may need repair or replacement, broken equipment requires fixing, and animals need tending. For instance, animals need regular feeding, watering, exercising, and frequent grooming as well as a clean stall or a similar clean living area.

However, cleaning out a stall such as a horse's stall can be a very time-consuming process. Used bedding and manure must be removed from the stall and transported to a dump site. Fresh bedding must then be taken to the stall and spread around inside the stall.

What is needed is an apparatus that expedites the process of removing used bedding and manure from a stall, transporting that used bedding and manure to a dump site, and distributing that used bedding and manure at the dump site.

SUMMARY OF THE INVENTION

The improvements of the present invention for a vacuum-cleaning apparatus for a stable wherein the apparatus is adapted for being towed behind a powered vehicle with a power take off unit include a two-wheel trailer; a tank mounted on the trailer wherein the tank has an air-tight tank cavity, at least one cavity input port, a rear end, and a bottom side; a hydraulic pump connected to, and powered by, the power take off unit of the powered vehicle; a debris-removing unit including an intake unit having a scoop element and a hand-operated handle pivotally connected to the scoop unit wherein the scoop unit includes rotating tines structured to lift and collect debris from a floor of a stable and wherein the scoop unit has a hydraulic motor connected to, and powered by, the hydraulic pump; a vacuuming unit having a vacuum input and a conduit connecting the vacuum input to the air-tight tank cavity wherein the vacuuming unit has a hydraulic motor connected to, and powered by the hydraulic pump; a debris-scattering unit including a belt conveyor spaced inside and along the bottom side of the tank cavity wherein the conveyor has a hydraulic motor connected to, and powered by, the hydraulic pump and wherein the conveyor extends to an opening in the rear end of the tank; and a hydraulically operated door having an open configuration, wherein the conveyor can convey debris through the opening to thereby scatter debris rearwardly from the trailer as the trailer is being towed behind the powered vehicle, and a closed configuration, wherein an air-tight seal is formed around the opening to thereby establish the air-tight feature of the tank cavity.

The debris-scattering unit includes a circularly shaped auxiliary scattering portion and a hydraulic motor that is connected to, and powered by the hydraulic pump. The auxiliary scattering portion is rotatably mounted on a fore-to-aft axis such that the auxiliary scattering portion is positioned above, and in close proximity to, the conveyor wherein a portion of the debris being conveyed rearwardly from the tank cavity by the conveyor is scattered transversely from the trailer as the trailer is being towed behind the powered vehicle.

The vacuum-cleaning apparatus may also include a hand-held rake having a hollow handle with a handle port located at a distal end of the handle and a plurality of hollow tines, wherein the hollow tines are connected in fluid flow communication with the handle port. A second vacuum hose connects the handle port in fluid flow communication with the at least one cavity input port.

PRINCIPAL OBJECTS AND ADVANTAGES OF THE INVENTION

The principal objects and advantages of the present invention include: providing a vacuum-cleaning apparatus for a stable; providing such a vacuum-cleaning apparatus that has a scoop element with rotating tines powered by a hydraulic motor; providing such a vacuum-cleaning apparatus having a hand-held rake with hollow tines; and generally providing such a vacuum-cleaning apparatus that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of a vacuum-cleaning apparatus for a stable in accordance with the present invention.

FIG. 2 is a perspective view of a scoop element of the vacuum-cleaning apparatus for a stable.

FIG. 3 is a perspective view of a hand-held rake with hollow tines of the vacuum-cleaning apparatus for a stable in accordance with the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a vacuum-cleaning apparatus for a stable in accordance with the present invention, as shown in FIGS. 1 through 3. The vacuum-cleaning apparatus 10 is adapted for being towed behind a powered vehicle 12 and for being powered by a power take off unit 14 of the powered vehicle 12. The apparatus 10 includes a two-wheel trailer 22, a tank 24 mounted on the trailer 22, a hydraulic pump 26, a debris-removing unit 28, and a debris-scattering unit 30.

The tank 24 has an air-tight tank cavity 32, cavity input ports 34, a rear end 36, and a bottom side 38.

The hydraulic pump 26 is connected to, and powered by, the power take off unit 14 of the powered vehicle 12.

The debris-removing unit 28 includes an intake unit 42, and a first vacuum hose 46. The intake unit 42 includes a scoop element 52 and a hand-operated handle 54 pivotally connected to the scoop element 52. The scoop element 52 includes rotating tines 56 that are powered by a hydraulic motor 58 connected to the hydraulic pump 26. The scoop element 52 is structured to lift and collect debris from a floor 60 of a stable. The vacuum-cleaning apparatus 10 includes hydraulic hoses 62 connecting the hydraulic pump 26 to the various hydraulic motors described herein.

A vacuuming unit 64 has a vacuum input 68 that is connected to the air-tight tank cavity 32 by conduit 69. Filters 70 interposed in conduit 69, prevent air-entrained debris from traveling from the air-tight tank cavity 32 to the vacuuming unit 64. The vacuuming unit 64 is connected to, and is powered by, the hydraulic pump 26. The first vacuum hose 46 connects the intake unit 42 in fluid flow communication with one of the cavity input ports 34 of the air-tight tank cavity 32, as indicated in FIG. 1, to thereby remove the debris lifted and collected by the intake unit 42 from the floor 60 of a stable and to discharge the debris, removed by the intake unit 42, through the cavity input ports 34 into the tank cavity 32.

The debris-scattering unit 30 includes a belt conveyor 72 spaced inside and along the bottom side 38 of the tank cavity 32. The conveyor 72 is connected to, and powered by, a hydraulic motor 74 powered by the hydraulic pump 26. The conveyor 72 extends to an opening 77 in the rear end 36 of the tank 24. A hydraulically operated door 76 in the rear end 36 has an open configuration, wherein the conveyor 72 can convey debris through the opening 77 to scatter debris from the tank cavity 32 rearwardly from the trailer 22 as the trailer 22 is being towed behind the powered vehicle 12, and a closed configuration, wherein an air-tight seal is formed around the opening 77 to establish the air-tight feature of the tank cavity 32.

The vacuum-cleaning apparatus 10 may include a handheld rake 78 having a hollow handle 80 with a handle port 82 located at a distal end 84 of the handle 80 and a plurality of hollow tines 86, wherein the hollow tines 86 are connected in fluid flow communication with the handle port 82. A second vacuum hose 90 connects the handle port 82 in fluid flow communication with one of the cavity input ports 34 of the vacuuming unit 64.

The debris-scattering unit 30 of the vacuum-cleaning apparatus 10 may also include a circularly shaped auxiliary scattering portion 92 that is connected to, and is powered by hydraulic motor 74. The auxiliary scattering portion 92 is rotatably mounted on a fore-to-aft axis 94 wherein the auxiliary scattering portion 92 is positioned above, and in close proximity to, the conveyor 72 so that a portion of the debris being conveyed rearwardly from the tank cavity 32 by the conveyor 72 is scattered transversely from the trailer 22 as the trailer 22 is being towed behind the powered vehicle 12.

The auxiliary scattering portion 92 may be mounted to extend rearwardly from the rear end 36 as indicated in FIG. 1. In that event, the hydraulically operated door 76 is opened to allow debris from the conveyor to impinge on the auxiliary scattering portion 92. When not scattering debris, the hydraulically operated door 95 is closed to establish the air-tight feature of the tank cavity 32. Alternatively, the auxiliary scattering portion 92 may be hydraulically retracted to be contained within the tank cavity 32 when not being used to scatter debris, and hydraulically extended rearwardly from the rear end 36 when being used for scattering debris.

If desired, the vacuum-cleaning apparatus 10 may also include a reservoir 96 containing a substance that may be distributed as needed to control flies, etc.

In an application of the vacuum-cleaning apparatus 10 of the present invention, the trailer 22 is connected to the powered vehicle 12 and the hydraulic pump 26 is connected to the power take-off 14 of the powered vehicle 12. The scoop element 52 and/or the rake 78 are connected to the vacuuming unit 64 and to the hydraulic pump 26. The hydraulic motor 58 powering the vacuuming unit 64 is activated so debris can be removed from the floor 60. When the cleaning process has been completed or when the tank 24 is filled to capacity, the powered vehicle 12 is used to tow the trailer 22 across a disposal area, such as a pasture. As the trailer 22 is being towed, the conveyor 72 and the auxiliary scattering portion 92 are activated to scatter the debris rearwardly and transversely from the rear end 36 of the trailer 22.

It is to be understood that while certain forms of the present invention have been illustrated and described herein, it is not to be limited to the specific forms or arrangement of parts as described and shown.

The invention claimed is:

1. A vacuum-cleaning apparatus for a stable, the apparatus adapted for being towed behind a powered vehicle having a power take off unit and comprising:
    (a) a two-wheel trailer;
    (b) a tank having an air-tight tank cavity, at least one cavity input port, a rear end, and a bottom side, and wherein the tank is mounted on the trailer;
    (c) a hydraulic pump connected to, and powered by, the power take off unit of the powered vehicle;
    (d) a debris-removing unit including:
        (1) an intake unit having a scoop element and a hand-operated handle pivotally connected to the scoop unit wherein the scoop unit includes rotating tines structured to lift and collect debris from a floor of a stable; the scoop unit having a hydraulic motor connected to, and powered by, the hydraulic pump,
        (2) a vacuuming unit having a vacuum input port and a conduit connecting the vacuum input to the air-tight tank cavity; the vacuuming unit also having a hydraulic motor connected to, and powered by the hydraulic pump; and
    (e) a debris-scattering unit including a belt conveyor spaced inside and along the bottom side of the tank cavity; the conveyor having a hydraulic motor connected to, and powered by, the hydraulic pump; the conveyor extending to an opening in the rear end of the tank; and
    (f) a hydraulically operated door having an open configuration wherein the conveyor can convey debris through the opening to thereby scatter debris rearwardly from the trailer as the trailer is being towed behind the powered vehicle, and a closed configuration wherein an air-tight seal is formed around the opening to thereby establish the air-tight feature of the tank cavity.

2. The apparatus as described in claim 1, further comprising:
    (a) a hand-held rake having a hollow handle with a handle port located at a distal end of the handle and a plurality of hollow tines, wherein the hollow tines are connected in fluid flow communication with the handle port; and
    (b) a second vacuum hose connecting the handle port in fluid flow communication with the at least one cavity input port.

3. The apparatus as described in claim 1, further comprising the debris-scattering unit having a circularly shaped auxiliary scattering portion having a hydraulic motor connected to, and powered by the hydraulic pump; the auxiliary scattering portion being rotatably mounted on a fore-to-aft axis wherein the auxiliary scattering portion is positioned above, and in close proximity to, the conveyor belt so that a portion of the debris being conveyed rearwardly from the tank cavity by the conveyor belt is scattered transversely from the trailer as the trailer is being towed behind the powered vehicle.

* * * * *